United States Patent
Bagheri

(10) Patent No.: US 11,550,066 B2
(45) Date of Patent: Jan. 10, 2023

(54) METHOD AND ARRANGEMENT FOR IMPROVING GLOBAL POSITIONING PERFORMANCE OF A ROAD VEHICLE

(71) Applicant: ZENUITY AB, Gothenburg (SE)

(72) Inventor: Toktam Bagheri, Hovås (SE)

(73) Assignee: ZENUITY AB, Gothenburg (SE)

( * ) Notice: Subject to any disclaimer, the term of this patent is extended or adjusted under 35 U.S.C. 154(b) by 156 days.

(21) Appl. No.: 16/444,221

(22) Filed: Jun. 18, 2019

(65) Prior Publication Data

US 2019/0383950 A1 Dec. 19, 2019

(30) Foreign Application Priority Data

Jun. 18, 2018 (EP) .................................. 18178298

(51) Int. Cl.
| | | |
|---|---|---|
| *G01S 19/48* | (2010.01) | |
| *G01C 21/30* | (2006.01) | |
| *G01S 13/86* | (2006.01) | |
| *G01S 13/931* | (2020.01) | |

(52) U.S. Cl.
CPC .............. *G01S 19/48* (2013.01); *G01C 21/30* (2013.01); *G01S 13/867* (2013.01); *G01S 13/931* (2013.01); *G01S 2013/9316* (2020.01); *G01S 2013/9327* (2020.01)

(58) Field of Classification Search
CPC ...... G01S 19/48; G01S 13/867; G01S 13/931; G01S 2013/9316; G01S 2013/9327; G01C 21/30
See application file for complete search history.

(56) References Cited

U.S. PATENT DOCUMENTS

| | | | |
|---|---|---|---|
| 9,697,733 B1 | 7/2017 | Penilla et al. | |
| 9,933,268 B2 | 4/2018 | Bagheri | |
| 2010/0164789 A1* | 7/2010 | Basnayake | ............ G01S 5/0072 |
| | | | 342/357.23 |

(Continued)

FOREIGN PATENT DOCUMENTS

| | | |
|---|---|---|
| CN | 104502936 | 4/2015 |
| DE | 102012224110 | 6/2014 |

(Continued)

*Primary Examiner* — Ig T An
(74) *Attorney, Agent, or Firm* — Duane Morris LLP; Gregory M. Lefkowitz; Randall C. Pyles

(57) ABSTRACT

Method for improving global positioning performance of a first road vehicle (10), the method comprising, by means of a data server (3, 4, 4"): acquiring data from onboard sensors (2a, 2b, 2c, 2d, 2e, 2f, 2g) arranged on the first road vehicle (10) and on at least two neighbouring road vehicles (10', 10", 10'''), the data comprising data on relative positions and data on heading angle and velocity of the road vehicles (10, 10', 10", 10'''), and acquiring global positioning data of at least two of the road vehicles (10, 10', 10", 10'''), processing (102) data comprising the global positioning data, the data, with corresponding timestamp, acquired from the onboard sensors (2a, 2b, 2c, 2d, 2e, 2f, 2g), and a motion model for each of the first road vehicle (10) and the at least two neighbouring road vehicles (10', 10", 10''') using a data fusion algorithm, calculating adjusted global positioning data for the first road vehicle (10) and communicating (104) the adjusted global positioning data to a positioning system (6) of the first road vehicle (10).

15 Claims, 2 Drawing Sheets

(56) References Cited

U.S. PATENT DOCUMENTS

| | | | |
|---|---|---|---|
| 2012/0271540 A1 | 10/2012 | Miksa et al. | |
| 2015/0205298 A1* | 7/2015 | Stoschek | B60L 50/60 701/23 |
| 2017/0307763 A1* | 10/2017 | Browning | G01S 19/48 |
| 2018/0160419 A1 | 6/2018 | Jiang et al. | |
| 2018/0232947 A1* | 8/2018 | Nehmadi | G01S 7/295 |
| 2018/0239032 A1 | 8/2018 | Thiel et al. | |
| 2019/0382003 A1* | 12/2019 | Jiang | G08G 1/163 |

FOREIGN PATENT DOCUMENTS

| | | |
|---|---|---|
| WO | 2017189361 | 11/2017 |
| WO | 2018063245 | 4/2018 |

\* cited by examiner

METHOD AND ARRANGEMENT FOR IMPROVING GLOBAL POSITIONING PERFORMANCE OF A ROAD VEHICLE

CROSS-REFERENCE TO RELATED APPLICATIONS

This application claims priority to European Patent Application No. 18178298.8, filed Jun. 18, 2018, the entire contents of which are incorporated herein by reference.

TECHNICAL FIELD

The disclosure is related to a method and arrangement for improving global positioning performance of a road vehicle.

BACKGROUND

Global positioning of an autonomous driving (AD) road vehicle is mainly based on positioning data such as Global Positioning System (GPS) coordinates. Such positioning data may not be very accurate and may differ from the actual global position of the road vehicle at a certain time. For many vehicles, and especially for AD vehicles, a more precise global positioning of the vehicle is critical and there is a need to develop approaches to address problems with inadequate global positioning accuracy.

One approach is given by CN104502936, which discloses a positioning and navigation system comprising a combined positioning unit, an intelligent ranging unit, a cloud communication unit and a vehicle-mounted display unit. The combined positioning unit is used for realizing real-time positioning of the vehicle; the intelligent ranging unit is used for realizing calculation on the distance between the vehicle and a surrounding target; and the cloud communication unit is used for receiving data generated by the combined positioning unit and the intelligent ranging unit and for uploading the data to a cloud service centre. The cloud service centre carries out map labelling on navigation positioning data, and the labelling information is issued to the vehicle-mounted display unit.

DE102012224110 discloses a method and system for determining positioning data of an object on a road. An environmental sensor system, e.g. camera, radar sensor, can be used to determine relative distances between an object whose absolute geographical position is known and an object to be located. The determined relative distances can serve as a filter basis, on the basis of which the positioning data of the object to be located can either be completely predetermined or, for example, specified in terms of tolerance. By the method an object can determine its absolute geographical position using the absolute geographical position of the other object and the relative distances. An object may also determine the position of another other object if its own absolute geographical position but not the corresponding absolute geographical position of the other object is available.

In U.S. Pat. No. 9,933,268 is disclosed a digital map enhancement system for improving accuracy of pre-stored digital map data of a digital map to be utilized by a vehicle. The system determines a current position of the vehicle, and identifies, in the pre-stored digital map data, a mapped digital landmark representing a stationary landmark predicted to be in the vicinity of the current position of the vehicle, which mapped digital landmark includes a pre-stored position of the stationary landmark. The system detects the stationary landmark by one or more sensor devices on-board the vehicle, which are adapted for observing the surroundings of the vehicle, and determines a detected position of the stationary landmark based on the current position of the vehicle and the detection of the stationary landmark. The system updates the pre-stored position of the mapped digital landmark with the detected position of the stationary landmark.

SUMMARY

An object of the present invention is to provide a method for improving global positioning performance of a road vehicle using global positioning data and information from onboard sensors on the road vehicle and on at least two neighbouring road vehicles. Another objective is to provide an arrangement for improving global positioning performance of a road vehicle.

The invention is defined by the appended independent claims. Embodiments are set forth in the appended dependent claims and in the figures.

According to a first aspect there is provided a method for improving global positioning performance of a first road vehicle, the method comprising, by means of a data server: acquiring data from onboard sensors arranged on the first road vehicle and on at least two neighbouring road vehicles, the data comprising data on relative positions and data on heading angle and velocity of the road vehicles, and acquiring global positioning data of at least two of the road vehicles; processing the global positioning data, the data, with corresponding timestamp, acquired from the onboard sensors, and a motion model for each of the first road vehicle and the at least two neighbouring road vehicles, using a data fusion algorithm; calculating adjusted global positioning data for the first road vehicle, and communicating the adjusted global positioning data to a positioning system of the first road vehicle.

A road vehicle may be a car, a truck, a bus etc. The first road vehicle and the at least two neighbouring road vehicles may be different types of road vehicles or be the same type of road vehicle, e.g. cars. The road vehicles may be autonomous driving (AD) vehicles or vehicles with advanced driving assistance systems (ADAS) for measuring vehicle information and information about the vehicle surroundings. At least one of the vehicles may be an autonomous driving (AD) vehicle and the other vehicles with advanced driving assistance systems (ADAS). All vehicles may be AD vehicles. All vehicles may be vehicles with ADAS. A vehicle provided with ADAS is here a vehicle provided with systems to help a driver in the driving process, e.g. through systems such as blind spot alerting, automatic lane centring, automatic braking, traffic warnings, lane departure warning system, automatic lighting, adaptive cruise control etc. AD vehicles are vehicles that are capable of sensing their environment and to navigate without human input. AD vehicles may, hence, be controlled without human interaction. AD vehicles could range from fully automated to semi-automated vehicles.

The number of neighbouring vehicles used in the method should be at least two. The number of vehicles in the method may vary and may depend on different factors such as the number of onboard sensors on the vehicles, strength of sensor signals, distance to neighbouring vehicles etc. The road vehicles used by the method may form a wireless network.

The onboard sensors may be arranged to detect environmental information associated with the road vehicle. Such sensors may e.g. detect a location of the vehicle, a velocity of the vehicle, an orientation of the vehicle, heading angle of the vehicle, and a status of surroundings of the vehicle.

The at least two neighbouring road vehicles are located in relation to the first road vehicle in an area close enough such that onboard sensors on the respective road vehicle may detect at least one other vehicle. The size of such an area depends on the sensor set up on each road vehicle and the sensor coverage.

The time stamp is the time at which an event is recorded by an onboard sensor.

With a motion model for a road vehicle is here meant any vehicle motion model, e.g. a constant velocity model or a constant acceleration model.

Each road vehicle may be provided with a data server communication unit for sending/receiving data to/from the data server.

The global positioning data of a road vehicle may e.g. be Global Positioning System (GPS) coordinates. Such positioning data may not be very accurate and may differ from the actual global position at a certain time.

The global positioning data received by the data server may be global positioning data for the first road vehicle and one or more neighbouring vehicles, or global positioning data for the at least two neighbouring vehicles only.

With the data fusion algorithm desired parameters according to observations given at a present time and through a system model are estimated and predicted. Since the sensor data arrive at the data server at different rates with different communication delays, the sequential processing of sensor data may be computationally intensive. Therefore, a data fusion approach is proposed to deal with asynchronous sensor data, for example by using a multi-rate Kalman filter.

In real situations, sensors provide object information in different sampling periods. In many cases the sampling times are asynchronous. Thus, it is needed to design a multi-rate estimator for each object dynamics to estimate object parameters, e.g. position, velocity, heading angle, etc. at the same sampling period. This may be done using an asynchronous data fusion algorithm.

A positioning system of a vehicle is a system arranged to adjust the positioning of the vehicle on the road based on the received adjusted global positioning data.

For many vehicles, especially AD vehicles, a more precise global positioning of the vehicle is critical. With the present method the global positioning performance of a road vehicle may be improved. Using relative distances between vehicles (pseudo-ranges) results in a more accurate global positioning compared to pseudo-ranges calculated with respect to GPS satellites. As all vehicles are located in approximately the same plane, this improves the global positioning accuracy of a vehicle. For AD and ADAS vehicles the accurate positioning needed is in the longitudinal and latitudinal direction and as the pseudo-range calculated in the method is in this plane the positioning accuracy is improved compared to when using GPS coordinates alone. The present method is a cooperative vehicle global positioning method and each road vehicle may be seen as a moving anchor in a wireless network. Data that each road vehicle gathers about other vehicles is used to improve the global positioning. By this method, vehicles provided with ADAS may contribute for a more accurate global positioning of (an) AD vehicle(s).

The data server may be located in the first road vehicle.

The data server may comprise a central data server.

The data server could be a central data server, e.g. a cloud. The cloud may include different modules for communication; receiving and sending data, storing data, and processing of data.

The data server may comprise a data server located in at least one of the road vehicles and/or a central data server.

The data server could comprise a distributed data server with a data server arranged in at least one or more of the road vehicles, such that there may be a full vehicle-to-vehicle (V2V) communication. With full V2V communication the global positioning data is "younger" than if the information is sent to and processed in a central data server, i.e. a cloud.

Alternatively, the data server could be a distributed data server comprising a central data server (cloud) and (a) data server(s) located in at least one of the road vehicles, thereby reducing the amount of communication with the central data server. Some functions of the data server could then be performed by the central server and some functions by (a) data server(s) located in at least one of the vehicles. If one vehicle loses connection with the central server there may be a possibility to indirectly connect to the central server via another vehicle used in the method.

An onboard sensor may be selected from a group comprising radars, vision sensors and lidar sensors.

At least one of the road vehicles may be an autonomous driving (AD) vehicle.

At least one of the road vehicles may be a vehicle with advanced driving assistance systems (ADAS).

The global positioning data processed by the data server may comprise the global positioning data of the first road vehicle.

The global positioning data processed by the data server may consist of global positioning data of at least two of the neighbouring road vehicles, wherein the velocity of the road vehicles and the relative positions of the road vehicles may be used as positioning anchors for the first road vehicle when processing the data in the data server.

Here the global positioning data of the first road vehicle is missing, which may be the case if the GPS connection of the first road vehicle is lost for some reason, e.g. when driving through a tunnel.

A positioning anchor is a known object with respect to which the first road vehicle finds its position. For example, in a GPS system, the satellites are anchors. Anchors might be moving or stationary, their positions might be known or unknown.

Global positioning data of one or more neighbouring road vehicles may be processed with the other data in the data server and adjusted global positioning data for at least one of the one or more neighbouring road vehicles may be calculated and communicated to a positioning system of the neighbouring road vehicle(s).

Thereby, the global positioning of also such neighbouring road vehicles may be adjusted.

The method may further comprise, by means of the data server, to acquire data for a neighbouring road vehicle having no active onboard sensors from onboard sensors on at least two of the road vehicles, the data comprising vehicle identification data and data on heading angle and velocity of the road vehicle having no active onboard sensors, and to acquire global positioning data of at least the neighbouring road vehicle having no active onboard sensors. When processing data in the data server, processing also the global positioning data and the data, with corresponding time stamp, acquired from the onboard sensors for the neighbouring road vehicle having no active onboard sensors, and using the velocity of the neighbouring road vehicle having no active onboard sensors as a positioning anchor for the first road vehicle.

That a road vehicle does not have active onboard sensors is here meant that the vehicle is not provided with any onboard sensors or that the onboard sensors on the vehicle are not in use or not functioning.

In this way neighbouring road vehicles having no active onboard sensors may contribute in the method of improving the global positioning of the first road vehicle.

The velocity and heading angle for the road vehicle having no active onboard sensors may be obtained through odometry signals.

Vehicle identification data for at least some of the other vehicles used in the method may be acquired by the data server together with the vehicle identification data of the vehicle having no active road sensors.

The method may further comprise, by means of the data server, to acquire data for a neighbouring road vehicle having no active onboard sensors from onboard sensors on at least two of the road vehicles, the data comprising vehicle identification data and data on heading angle and velocity of the road vehicle having no active onboard sensors, and acquiring global positioning data of at least the neighbouring road vehicle having no active onboard sensors. When processing data in the data server, processing also the global positioning data and the data, with corresponding time stamp, acquired from the onboard sensors for the neighbouring road vehicle having no active onboard sensors. Adjusted global positioning data for the neighbouring road vehicle having no active onboard sensors may be calculated and communicated to a positioning system of the neighbouring road vehicle having no active onboard sensors.

That a road vehicle does not have active onboard sensors is here meant that the vehicle is not provided with any onboard sensors or that the onboard sensors on the vehicle are not in use or not functioning.

With this method, a road vehicle having no active onboard sensors but provided with positioning data sensor may be connected to the data server via the other road vehicles and be provided with adjusted positioning data from the data server.

With this method, at a low cost, also road vehicles having no active onboard sensors may be provided with adjusted positioning data which may be used to adjust the spatial position of the road vehicle.

This method would improve navigation performance where the positioning performance is poor and bring more accurate connected safety features to vehicles without onboard sensors.

The velocity and heading angle for the road vehicle having no active onboard sensors may be obtained through odometry signals.

Vehicle identification data for at least some of the other vehicles used in the method may be acquired by the data server together with the vehicle identification data of the vehicle having no active road sensors. This to make sure that the correct vehicle receives the adjusted global positioning data.

The vehicle identification data for a road vehicle having no active onboard sensors may be the license plate number.

The vehicle identification data of a vehicle without active onboard sensors need to be unique for that vehicle.

Based on the adjusted global positioning data communicated to the positioning system of a road vehicle, the global position of a road vehicle may be adjusted.

Such positioning adjustment is the spatial position of the vehicle in the longitudinal and latitudinal direction.

According to a second aspect there is provided an arrangement for improving global positioning performance of a first road vehicle. The arrangement comprises a data server communication unit for communication with a data server, onboard sensors arranged on the first road vehicle and being arranged to determine data on relative positions and data on heading angle and velocity of one or more neighbouring road vehicles, the data server communication unit further being arranged to send the determined data, with corresponding time stamp, to the data server. A global positioning sensor is arranged on the first road vehicle, the data server communication unit further being arranged to send global positioning data of the first road vehicle to the data server, and a positioning system is arranged on the first road vehicle. The data server communication unit further is arranged to receive to the positioning system of the first road vehicle adjusted global positioning data for the first road vehicle, the adjusted global positioning data obtained using a data fusion algorithm, the data fusion algorithm arranged to process global positioning data from the first road vehicle and at least one or more neighbouring road vehicles, a motion model of each road vehicle, data on relative positions of each road vehicle, and data on heading angle and velocity of the road vehicles, to calculate the adjusted global positioning data for the first road vehicle.

DETAILED DESCRIPTION

Figure 1:
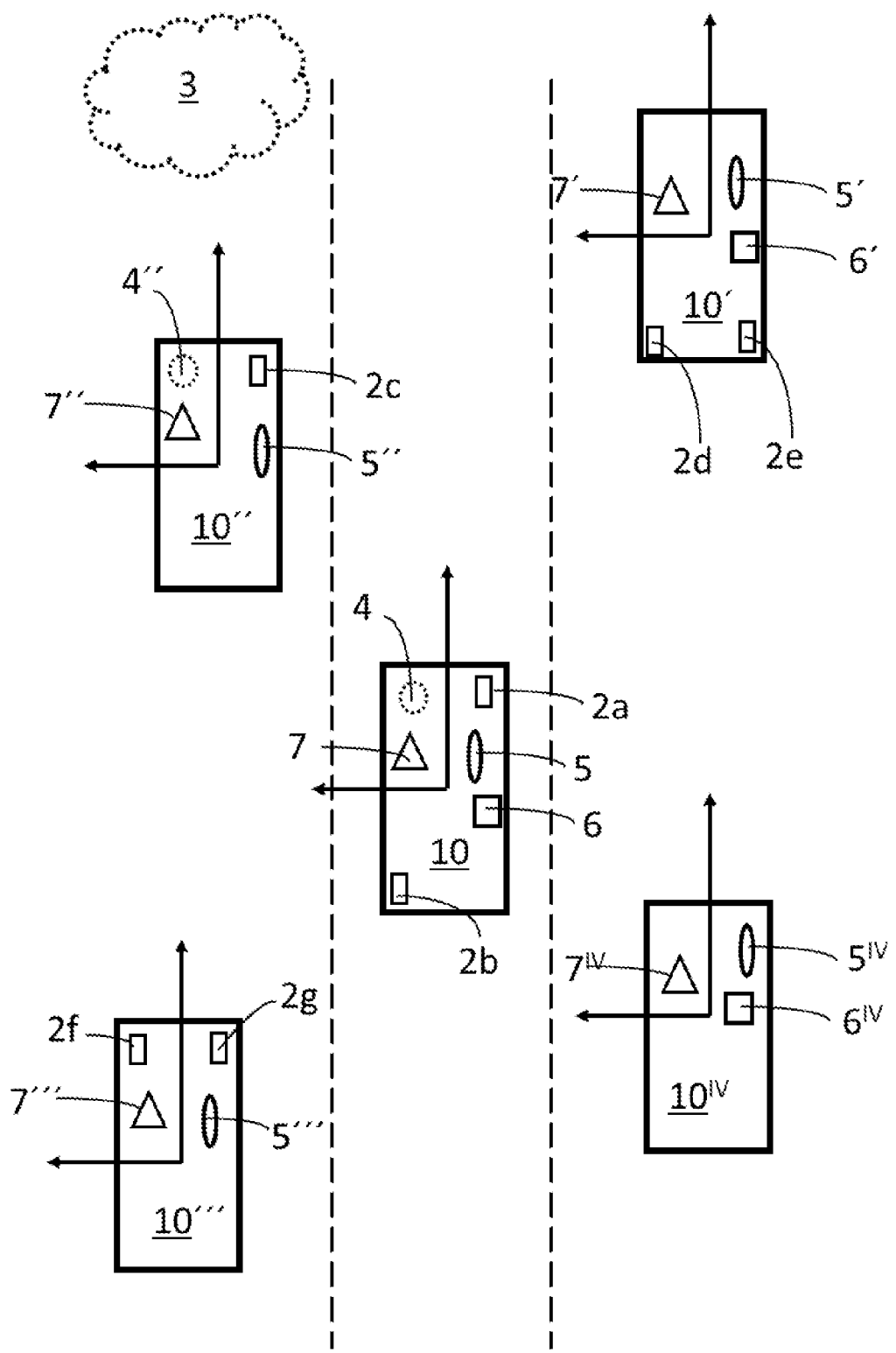
FIG. 1 illustrates an arrangement for improving global positioning performance of a first road vehicle using global positioning data and information from onboard sensors on the first road vehicle and on at least two neighbouring road vehicles.
Figure 2:
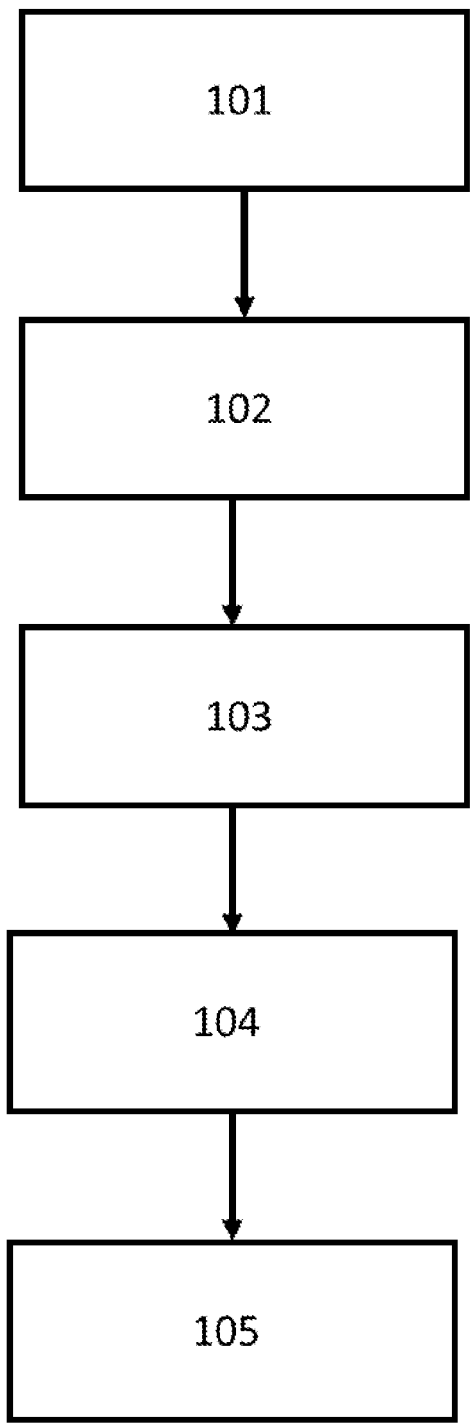
FIG. 2 schematically illustrates method steps of a method for improving global positioning performance of a first road vehicle.

Global positioning of an autonomous driving (AD) road vehicle is mainly based on positioning data such as Global Positioning System (GPS) coordinates, which may not be very accurate and may differ from the actual global position of the road vehicle at a certain time. In FIG. 1 is shown an arrangement for improving global positioning performance of a road vehicle 10 using global positioning data and information from onboard sensors 2, 2a, 2b, 2c, 2d, 2e, 2f, 2g on the road vehicle 10 and on at least two neighbouring road vehicles 10', 10'', 10'''. In FIG. 2 is schematically illustrated a method for improving the global positioning performance of a road vehicle.

As seen in FIG. 1 the arrangement comprises a first road vehicle 10 and at least two neighbouring road vehicles 10', 10'', 10''', a data server 3, 4, 4'' and onboard sensors 2a, 2b, 2c, 2d, 2e, 2f, 2g arranged on the first road vehicle 10 and on the at least two neighbouring road vehicles 10', 10'', 10'''. The road vehicles 10, 10', 10'', 10''' may be autonomous driving (AD) vehicles or vehicles with advanced driving assistance systems (ADAS). At least one of the vehicles may be an autonomous driving (AD) vehicle and the other vehicles with advanced driving assistance systems (ADAS). All vehicles may be AD vehicles. All vehicles may be vehicles with ADAS.

The onboard sensors 2a, 2b, 2c, 2d, 2e, 2f, 2g, e.g. radars, vision sensors and lidar sensors, may be arranged to determine data on relative positions and data on heading angle and velocity of the road vehicles 10, 10', 10'', 10'''. The vision sensor may be a camera. The radars may be front, rear and side radars, blind spot radars, etc. The number of onboard sensors 2a, 2b, 2c, 2d, 2e, 2f, 2g on a vehicle 10, 10', 10'', 10''' may vary but should be at least one. The number of onboard sensors on a vehicle engaged in the method may vary and may vary over time.

The data is sent, with corresponding time stamp, to the data server 3, 4, 4" via a data server communication unit 7, 7', 7", 7'" arranged in each vehicle. The data server may be a data server 4 located in the first road vehicle 10. The data server may alternatively be a central data server 3, i.e. a cloud. In yet an alternative, the data server may comprise one or more distributed data servers 4, 4" located in at least one of the road vehicles 10, 10', 10", 10'" and/or a central data server 3.

Global positioning sensors 5, 5', 5", 5'" may be arranged on the road vehicles 10, 10', 10", 10'". Global positioning data, e.g. Global Positioning System (GPS) coordinates, of at least two of the road vehicles 10, 10', 10", 10'" is sent to the data server 3, 4', 4" via the data server communication unit 7, 7', 7", 7'". This data may not be very accurate and may differ from the actual global position at a certain time. The global positioning data may comprise global positioning data of the first road vehicle 10 and of one or more of the neighbouring road vehicles 10', 10", 10'". Alternatively, the global positioning data may consist of global positioning data of at least two of the neighbouring road vehicles 10', 10", 10'" and no data for the first road vehicle 10.

Having acquired the data from the onboard sensors 2a, 2b, 2c, 2d, 2e, 2f, 2g, with corresponding time stamp, and the data from the global positioning sensors 5, 5', 5", 5'", the data server 3, 4, 4" may process the data and a motion model for each of the first road vehicle 10 and the at least two neighbouring vehicles 10', 10", 10'" using a data fusion algorithm and calculate an adjusted global positioning data for the first road vehicle 10. The adjusted global positioning data may be communicated to a positioning system 6 of the first road vehicle 10. The positioning system 6 may be arranged to adjust the global positioning of the vehicle 10 on the road, improving the global positioning performance of the first road vehicle. Data that each road vehicle 10, 10', 10", 10'" gathers about other vehicles is, hence, used to improve the global positioning of the first road vehicle 10 and a more accurate global positioning of the first road vehicle 10 may be obtained.

In the method shown in FIG. 2, the first step is to, by means of the data server 3, 4, 4", acquire data 101 from the onboard sensors 2a, 2b, 2c, 2d, 2e, 2f, 2g arranged on the first road vehicle and on at least two neighbouring road vehicles, the data comprising data on relative positions and data on heading angle and velocity of the road vehicles 10, 10', 10", 10'", and to acquire global positioning data of at least two of the road vehicles 10, 10', 10", 10'". Thereafter the data server 3, 4, 4" processes 102 the data comprising the global positioning data, the data, with corresponding timestamp, acquired from the onboard sensors 2a, 2b, 2c, 2d, 2e, 2f, 2g, and a motion model for each of the first road vehicle 10 and the at least two neighbouring road vehicles 10', 10", 10'". In the next step adjusted global positioning data for the first road vehicle 10 is calculated 103, and thereafter the adjusted global positioning data is communicated 104 to the positioning system 6 of the first road vehicle 10. Then, the global position of the first road vehicle may be adjusted 105 to a more accurate global position.

In some cases, global positioning data of the first road vehicle 10 may be missing. This situation may for example occur if the GPS connection of the first road vehicle 10 is lost for some reason, e.g. when driving through a tunnel. The global positioning data sent to the data server 3, 4, 4" then consists of global positioning data of at least two of the neighbouring vehicles 10'. 10", 10'". The velocity of the road vehicles 10, 10', 10", 10'" and relative positions of the road vehicles may in such a case be used as positioning anchors for the first road vehicle 10 when processing the data in the data server 3, 4, 4".

Also, the global positioning of a neighbouring road vehicle 10' may be adjusted with this arrangement and method. Global positioning data of the one or more neighbouring road vehicles 10' sent to the data server 3, 4, 4" may be processed together with the other data and adjusted global positioning data for the neighbouring road vehicle(s) 10' communicated to (a) positioning system(s) 6' of the neighbouring road vehicle(s) 10'.

Additionally, road vehicles having no onboard sensors, or such sensors being not in use or not functioning, may contribute in the method of improving the global positioning performance of the first road vehicle 10. In such case, the data server 3, 4, 4" acquires data for a neighbouring road vehicle $10^{IV}$ having no active onboard sensors from onboard sensor(s) 2a, 2b, 2c, 2d, 2e, 2f, 2g on at least two of the road vehicles 10, 10', 10", 10'". The data comprising a unique vehicle identification data, e.g. license plate number, for at least that road vehicle, and data, with corresponding time stamp, on heading angle and velocity of the neighbouring road vehicle $10^{IV}$ having no active onboard. The data server 3, 4, 4" also acquiring global positioning data of at least the neighbouring road vehicle $10^{IV}$ having no active onboard sensors. When processing also this data in the data server 3, 4, 4" the velocity of the neighbouring road vehicle $10^{IV}$ having no active onboard sensors may be used as a positioning anchor for the first road vehicle 10.

If a neighbouring road vehicle $10^{IV}$ does not have any onboard sensors or such sensors being not in use or not functioning, such a vehicle $10^{IV}$ may be connected to the data server 3, 4, 4" via the other road vehicles 10, 10', 10", 10'" and be provided with adjusted global positioning data from the data server 3, 4, 4" using the arrangement and method describe above. In such a case the data server 3, 4, 4" may acquire data for the neighbouring road vehicle $10^{IV}$ having no active onboard sensors from onboard sensors 2a, 2b, 2c, 2d, 2e, 2f, 2g on at least two of the road vehicles 10, 10', 10", 10'". The data comprising unique vehicle identification data, e.g. license plate number, and data, with corresponding time stamp, on heading angle and velocity of the road vehicle $10^{IV}$ having no active onboard sensors. The data server may further acquire global positioning data for at least the neighbouring road vehicle $10^{IV}$ having no active onboard sensors. This data being processed in the data server 3, 4, 4'" together with the other data to calculate adjusted global positioning data for the identified road vehicle $10^{IV}$ having no active onboard sensors. The adjusted positioning data may be communicated to a positioning system $6^{IV}$ of the neighbouring road vehicle $10^{IV}$ having no active onboard sensors. This method may improve navigation performance where the positioning performance is poor and bring more accurate connected safety features to vehicles without ADAS sensors.

The invention claimed is:

1. A method for improving global positioning performance of a first road vehicle, the method comprising:
  by a data server:
    acquiring data from onboard sensors arranged on said first road vehicle and on at least two neighbouring road vehicles, said data comprising data on relative positions and data on heading angle and velocity of said road vehicles, and acquiring global positioning data of at least two of said road vehicles so that the at least two of said neighbouring road vehicles are used as positioning anchors for the first road vehicle when processing the data in the data server, processing said global positioning data, said data, with a corresponding timestamp, acquired from said onboard sensors, the corresponding timestamp indicating a time at which an event is recorded by one of the onboard sensors, and a vehicle motion model for each of said first road vehicle and said at least two neighbouring road vehicles, using a data fusion algorithm, calculating adjusted global positioning data for said first road vehicle, and communicating said adjusted global positioning data to a positioning system of said first road vehicle.

2. The method of claim 1, wherein said data server is located in said first road vehicle.

3. The method of claim 1, wherein said data server is a central data server.

4. The method of claim 1, wherein said data server comprises a data server located in at least one of said road vehicles and a central data server.

5. The method of claim 1, wherein said onboard sensors are selected from a group comprising radars, vision sensors and lidar sensors.

6. The method of claim 1, wherein at least one of said road vehicles is an autonomous driving (AD) vehicle.

7. The method of claim 1, wherein at least one of said road vehicles is a vehicle with advanced driving assistance systems (ADAS).

8. The method of claim 1, wherein said global positioning data processed by said data server comprises global positioning data of said first road vehicle.

9. The method of claim 1, wherein said global positioning data processed by said data server consists of global positioning data of at least two of said neighbouring road vehicles.

10. The method of claim 1, wherein global positioning data of one or more neighbouring road vehicles is processed with other data in said data server and adjusted global positioning data for at least one of said one or more neighbouring road vehicles is calculated and communicated to a positioning system of said neighbouring road vehicle.

11. The method of claim 1, further comprising:
by said data server:
acquiring data for a neighbouring road vehicle having no active onboard sensors from onboard sensors on at least two of said road vehicles, said data comprising vehicle identification data and data on heading angle and velocity of said road vehicle having no active onboard sensors, and acquiring global positioning data from a global positioning sensor of at least said neighbouring road vehicle having no active onboard sensors, and when processing said data comprising said data on relative positions and velocity of said road vehicles, further processing said global positioning data and said data comprising said vehicle identification data and said data on heading angle and velocity, with corresponding time stamp, acquired from said onboard sensors for said neighbouring road vehicle having no active onboard sensors, wherein said neighbouring road vehicle having no active onboard sensors is used as a positioning anchor for said first road vehicle.

12. The method of claim 1, further comprising:
by said data server:

acquiring, from onboard sensors of at least two of said road vehicles, data for a neighbouring road vehicle having a global positioning sensor, said data comprising vehicle identification data and data on heading angle and velocity of said neighbouring road vehicle, and acquiring global positioning data from said global positioning sensor of the neighbouring road vehicle, when processing data, processing also said global positioning data and said data, with corresponding time stamp, acquired from said onboard sensors on said at least two of said road vehicles for said neighbouring road vehicle, calculating adjusted global positioning data for said neighbouring road vehicle, and communicating said adjusted global positioning data to a positioning system of said neighbouring road vehicle.

13. The method of claim 11, wherein said vehicle identification data for a road vehicle having no active onboard sensors is said license plate number.

14. The method of claim 1, further comprising, based on said adjusted global positioning data communicated to said positioning system of a road vehicle, adjusting said global position of the road vehicle.

15. An arrangement for improving global positioning performance of a first road vehicle, said arrangement comprising:

a data server communication unit for communication with a data server, onboard sensors arranged on said first road vehicle and being arranged to determine data on relative positions and data on heading angle and velocity of one or more neighbouring road vehicles, said data server communication unit further being arranged to send said determined data, with a corresponding time stamp indicating a time at which an event is recorded by one of the onboard sensors, to said data server, a global positioning sensor arranged on said first road vehicle, said data server communication unit further being arranged to send global positioning data of said first road vehicle to said data server, and a positioning system arranged on said first road vehicle, wherein said data server communication unit further is arranged to receive to said positioning system of said first road vehicle adjusted global positioning data for said first road vehicle, said adjusted global positioning data obtained using a data fusion algorithm, said data fusion algorithm arranged to process global positioning data from said first road vehicle and at least one of said one or more neighbouring road vehicles, a vehicle motion model of each road vehicle, data on relative positions of each road vehicle, and data on heading angle and velocity of said road vehicles so that the at least two of said neighbouring road vehicles are used as positioning anchors for the first road vehicle when processing the data in the data server, to calculate said adjusted global positioning data for said first road vehicle.

* * * * *